(12) United States Patent
O'Farrell

(10) Patent No.: US 9,477,451 B1
(45) Date of Patent: Oct. 25, 2016

(54) GENERATING DYNAMIC MEASUREMENT METADATA FOR EFFICIENT COMPILATION AND OPTIMIZATION ON A TARGET DEVICE

(71) Applicant: International Business Machines Corporation, Armonk, NY (US)

(72) Inventor: William G. O'Farrell, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/935,022

(22) Filed: Nov. 6, 2015

(51) Int. Cl.
G06F 9/45 (2006.01)
G06F 11/36 (2006.01)

(52) U.S. Cl.
CPC ........... *G06F 8/443* (2013.01); *G06F 11/3672* (2013.01)

(58) Field of Classification Search
CPC ........................... G06F 8/443; G06F 11/3672
USPC .................. 717/140–143, 150–153
See application file for complete search history.

(56) References Cited

U.S. PATENT DOCUMENTS

| | | | | |
|---|---|---|---|---|
| 7,237,234 B2* | 6/2007 | Granston | ................ | G06F 8/443 717/130 |
| 7,254,810 B2* | 8/2007 | Barsness | ................ | G06F 8/443 717/140 |
| 7,293,260 B1* | 11/2007 | Dmitriev | ............. | G06F 11/3466 714/E11.207 |
| 7,549,146 B2* | 6/2009 | Tian | ...................... | G06F 8/4441 717/148 |
| 7,620,943 B1* | 11/2009 | Garthwaite | ......... | G06F 12/0276 707/999.202 |
| 7,937,694 B2* | 5/2011 | Meijer | .................. | G06F 9/4425 717/114 |
| 8,533,699 B2* | 9/2013 | Moir | ...................... | G06F 9/467 717/151 |
| 8,543,991 B2* | 9/2013 | Ramaswamy | ...... | G06F 9/45516 717/120 |
| 8,578,348 B2* | 11/2013 | Fliess | ........................ | G06F 8/70 717/135 |
| 8,615,750 B1* | 12/2013 | Narayana Iyer | ........ | G06F 8/456 709/203 |
| 8,752,034 B2* | 6/2014 | Gounares | .................. | G06F 8/70 717/151 |
| 8,850,411 B2* | 9/2014 | Kelem | ................ | G06F 15/7867 717/140 |
| 8,856,767 B2* | 10/2014 | Jalan | .................... | G06F 11/3419 717/151 |
| 9,009,681 B2* | 4/2015 | Schmidt | .................. | G06F 8/443 717/130 |
| 9,032,379 B2 | 5/2015 | Kalogeropulos et al. | | |
| 9,038,034 B2* | 5/2015 | Akenine-Moller | ....... | G06F 8/41 717/136 |
| 9,047,101 B2 | 6/2015 | Cabillic et al. | | |
| 2013/0311758 A1 | 11/2013 | Caprioli et al. | | |
| 2015/0143348 A1 | 5/2015 | You et al. | | |

FOREIGN PATENT DOCUMENTS

WO 2012101530 A1 8/2012

OTHER PUBLICATIONS

Larsson et al, "Test-Architecture Optimization and Test Scheduling for SOCs with Core-Level Expansion of Compressed Test Patterns", ACM, pp. 188-193, 2008.*

(Continued)

*Primary Examiner* — Anil Khatri
(74) *Attorney, Agent, or Firm* — Shumaker & Sieffert, P.A.

(57) ABSTRACT

Techniques are described for improving compilation and optimization of application code based on generated metadata based on one or more dynamic measurements of the application code. In one example, a method comprises generating metadata based on one or more dynamic measurements of a code portion. The method further comprises associating the metadata with one or more selected segments of the code portion. The method further comprises deploying the one or more selected segments of the code portion with the associated metadata to a target unit for compilation and optimization.

20 Claims, 5 Drawing Sheets

(56) References Cited

OTHER PUBLICATIONS

Iyengar et al, "A Unified Approach for SOC Testing Using Test Data Compression and TAM Optimization", IEEE, pp. 1-2, 2003.*
Duboscq et al, "Speculation Without Regret: Reducing Deoptimization Meta-data in the Graal compiler", ACM, pp. 187-193, 2014.*
Adl-Tabatabai et al, "Prefetch Injection Based on Hardware Monitoring and Object Metadata", ACM, pp. 267-276, 2004.*
Xu et al, "Metadata Driven Memory Optimizations in Dynamic Binary Translator", ACM, pp. 148-157, 2007.*
Nimbarte et al, "Method Based Technique of Compilation with Compilation Server" ACM, pp. 1-6, 2010.*
Balon et al, "Combined Intra- and Inter-domain Traffic Engineering using Hot-Potato Aware Link Weights Optimization", ACM, pp. 441-442, 2008.*
Bronson et al, "Feedback-Directed Barrier Optimization in a Strongly Isolated STM", ACM, pp. 213-225, 2009.*
Stadler et al., "Compilation Queuing and Graph Caching for Dynamic Compilers," Proceedings of the sixth ACM workshop on Virtual machines and intermediate languages, New York, NY, Oct. 21, 2012, pp. 49-58.
Jensen et al., "Compiler Feedback using Continuous Dynamic Compilation during Development," Workshop on Dynamic Compiiation Everywhere, vol. V., No. N., Article A, Jan. 2014, 12 pp.
Bosworth, "Ahead of Time Dynamic Translation," MRE'04, Microsoft, Mar. 21, 2004, 43 pp.

* cited by examiner

_US 9,477,451 B1_

GENERATING DYNAMIC MEASUREMENT METADATA FOR EFFICIENT COMPILATION AND OPTIMIZATION ON A TARGET DEVICE

TECHNICAL FIELD

This disclosure relates to compilers.

BACKGROUND

In the Development Operations ("DevOps") in-the-cloud culture, there are rapid and repeated releases of software. In the past, there were long release cycles and extensive testing before each release. Presently, software release cycles have dramatically shortened and may require builds and releases to occur more rapidly. These builds may require additional testing past the release. Traditionally, dynamic compilers may be used to compile and optimize such software.

A compiler may be made of one or more programs that convert a software application's source code written in a programming language into another computer form of code such as bytecode or machine code. A compiler can perform many operations including preprocessing, parsing, code generation, and code optimization. A compiler may perform compilation and optimization of an application's source code to turn the code into efficient executable code. Optimization may depend on the execution environment.

SUMMARY

In one aspect of the invention, a method includes generating metadata based on one or more dynamic measurements of a code portion. The method further includes associating the metadata with one or more selected segments of the code portion. The method further includes deploying the one or more selected segments of the code portion with the associated metadata to a target unit for compilation and optimization.

In another aspect, a computer system includes one or more processors, one or more computer-readable memories, and one or more computer-readable storage mediums. The computer system further includes program instructions, stored on at least one of the one or more storage mediums for execution by at least one of the one or more processors via at least one of the one or more memories, to generate metadata based on one or more dynamic measurements of a code portion. The computer system further includes program instructions, stored on at least one of the one or more storage mediums for execution by at least one of the one or more processors via at least one of the one or more memories, to associate the metadata with one or more selected segments of the code portion. The computer system further includes program instructions, stored on at least one of the one or more storage mediums for execution by at least one of the one or more processors via at least one of the one or more memories, to deploy the selected segment with the associated metadata to a target unit for compilation and optimization.

In another aspect, a method includes receiving one or more deployed segments of code and associated metadata, wherein the metadata is based on one or more dynamic measurements of a code portion including the one or more deployed segments of code. The method further includes compiling and optimizing the one or more deployed segments of code in accordance with the metadata.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
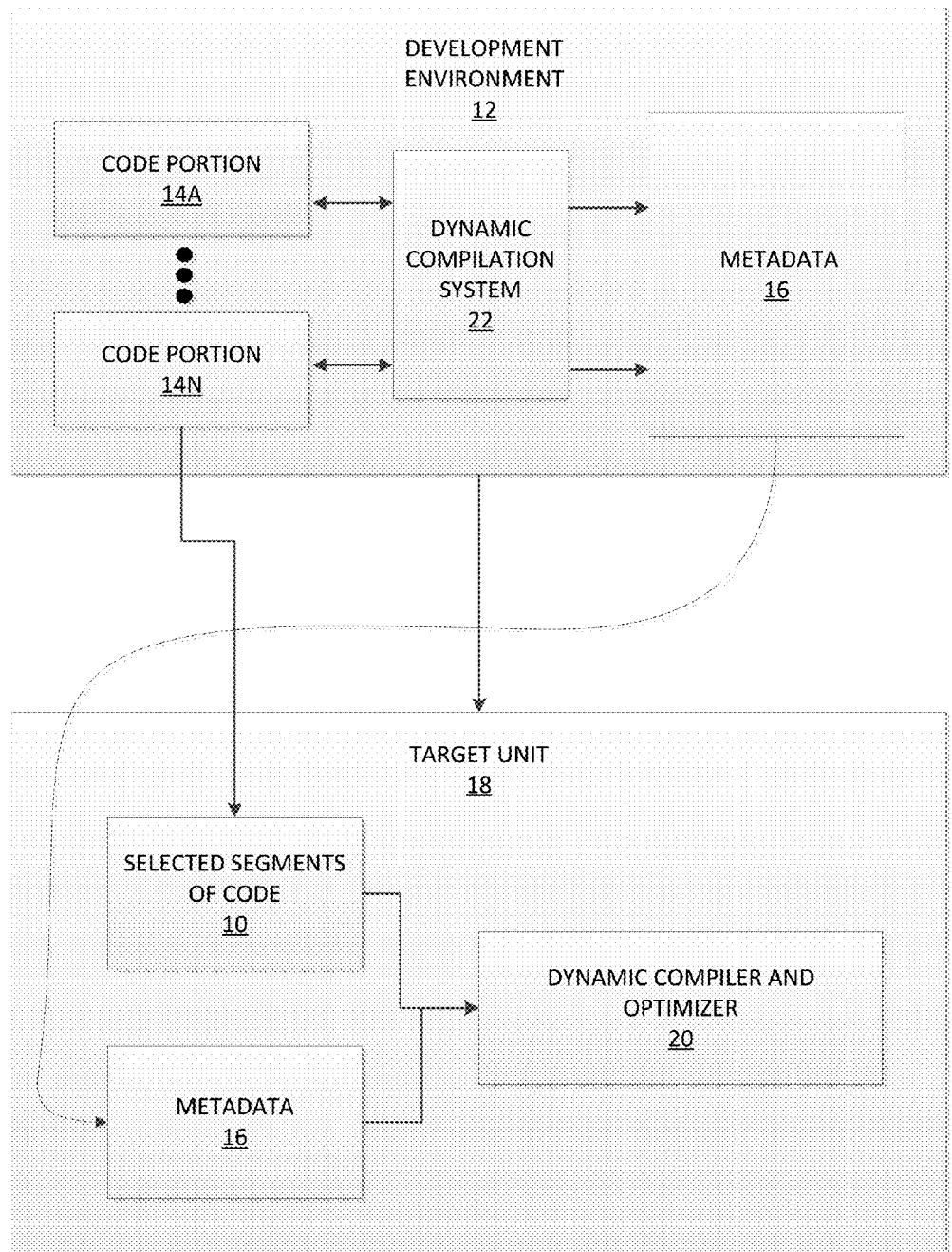
FIG. 1 shows a block diagram that illustrates an example dynamic compilation system that may perform, with one or more processors, an enhanced compilation of deployed code with associated dynamic measurement metadata, in one aspect of this disclosure.

This disclosure provides a method for improving an application's use of dynamic compilers and optimizers through the use of enhanced metadata associated with the application. The purpose of the metadata is to provide information and advice to a dynamic compiler about deployed code, including, but not limited to, prior testing levels of hotness, optimization, hardware, known memory and/or time requirements for given sections of code, and threading, for example.

Dynamic compilation occurs when compilation and optimization is delayed until a program is loaded or executed. Dynamic compilation is a technique for deploying applications that are compiled on a target computer, or which are partially compiled in the development environment prior to deployment and then compilation is completed on the target computer, rather than fully compiling the code at the development environment. More specifically, dynamic compilation allows compiling and optimization to be "tuned" to the target computer, thereby generating more efficient code. For example, in Just-in-Time (JIT) technology used in some programming languages and runtimes such as Java and Smalltalk, interpretable bytecode may be compiled and optimized. Compilation and optimization may be performed based on dynamic measurements of the "hotness of methods" (e.g., which methods are most heavily used and to what degree) at the target computer. By knowing the level of hotness, a compiler at the target can be selected with a corresponding optimization level, e.g., a higher optimization level. However, traditional dynamic compilation techniques may incur problems with resource utilization and DevOps style integration between application developers/testers and the compiler. For example, a hotness level of a code is often determined after multiple iterations of compilation, which may pose a high burden on computer resources.

Traditional methods of dynamic compilation often take a long time to complete. Such methods can be memory-intensive, which may cause the machine conducting the compilation and optimization to hang or fail. There may be delays in starting applications because compilation would occur on the user's machine rather than the developer's machine. These traditional dynamic compilation techniques hinder computer resource utilization because an application's source code that is dynamically compiled may initially run slowly while the system determines through profiling which methods or code sections are worth compiling at higher levels of optimization.

Pre-compilation methods may be used to resolve the slow start-up times, but pre-compilation is traditionally performed according to the lowest-common-denominator of machine architecture (generally the architecture of older machines) and/or hotness level. The hotness level of a code is often determined after multiple iterations of compilation, which may pose a high burden on computer resources. Burdening or monopolizing these computer resources may take resources away from the application, which may further slow down the speed or rate of execution. Optimization may also be determined by profiling the application dynamically, which may also use an extensive amount of computer resources. In a cloud environment, an application may move from server to server, which may trigger repeated profiling and compilations with each move.

Traditional dynamic compilation techniques also lack integration between application developers/testers and the information technology operations (which can be the compiler). Compilers, whether JIT or static, may contain software bugs. For this reason, application developers using statically compiled languages may often limit the optimization level used on some portions of their code if prior testing revealed that certain compiler flaws have been exposed by their code compiled at higher optimization levels. Current dynamic compilers have no knowledge of such problems, and will select higher optimization levels depending on the degree of hotness levels. Traditionally, JIT compilers cannot determine if optimization levels have been previously tested. Thus, bugs within the compiler may often cause the compiler to crash, use too much memory, or run in an infinite loop.

Applications may also have bugs that are exposed by higher optimization levels. Traditional dynamic compilers may not have pre-existing knowledge of these optimization levels necessary to catch the software bugs. Generally, statically compiled applications are compiled for a minimal architecture level because it cannot be assumed that target devices are based on more advanced architecture. Without pre-existing knowledge of the target computer's architecture level, statically compiled applications do not take advantage of the specialized hardware and new instructions within computing devices with more advanced architecture.

Whether a bug is in the compiler or the application, it often cannot be anticipated ahead of time. For example, in an accelerated DevOps scenario, it is not possible to test each revision of an application against every possible dynamic compiler version or every possible hardware level, especially future hardware levels that weren't available when the testing process was undertaken. Debugging becomes a lengthy and arduous process and may create unnecessary work stoppages in the rapid development and deployment expected of DevOps. As such, it may not be feasible simply to compile all programs at the highest level possible for the highest architecture possible.

In sharp contrast to traditional systems, a system of this disclosure may generate metadata based on dynamic measurements of portions of an application's source code, associate the metadata with the portions of code, and deploy the portions of code with the metadata to a target unit of a target computing device such that the metadata is configured or enabled for the target unit to reference or use to perform customized compilation and optimization of the deployed application code. Systems and methods of this disclosure may also improve dynamic compilation of an application at a target device based on metadata associated with an application's source code.

FIG. 1 shows a block diagram that illustrates an example dynamic compilation system 22 that may perform, with one or more processors, an enhanced compilation of deployed code with associated dynamic measurement metadata 16 ("metadata 16"), in one aspect of this disclosure. FIG. 1 illustrates an example context in which dynamic compilation system 22 may generate metadata 16 based on dynamic measurements of an application's code portions 14A-14N (collectively "code portions 14"), and associate metadata 16 with selected code portions 14 within a development environment 12, to be deployed to and used by a target unit 18. Target unit 18 may include a customer's or user's machine or any computer that may execute or run application source code.

The development environment 12 may include a software and/or hardware testing environment in which application source code may be developed. For example, code portion 14A may be previously developed and tested prior to the development of code portions 14N. Code portions 14A-14N may be deployed to a target unit 18 for compilation and optimization.

Various examples of the techniques of this disclosure may readily be applied to various forms of code portions 14, including bytecode, pre-compiled classes, or statically compiled binaries subject to re-compilation. Various examples within this disclosure may be utilized in a DevOps in-the-cloud environment, but are not limited to such environments.

When a code portion 14 is deployed to target unit 18, the deployed code may include selected segments 10 of deployed code including at least one predetermined unit of classes or compilation units, methods, collections of basic blocks (e.g., loops), or individual basic blocks, for example.

Metadata 16 may include information based on the application source code that may be deployed to target unit 18 to enable performance of an initial dynamic compilation or subsequent dynamic compilation. Target unit 18 may include a dynamic compiler and optimizer 20 ("compiler 20"). Compiler 20 may thus receive one or more deployed segments of code 10 and associated metadata 16, where the metadata 16 is based on one or more dynamic measurements of a code portion including the one or more deployed segments of code 10. Compiler 20 may then compile and optimize the one or more deployed segments of code 10 in accordance with the metadata 16 based on the dynamic measurements of the code portion.

Figure 2:
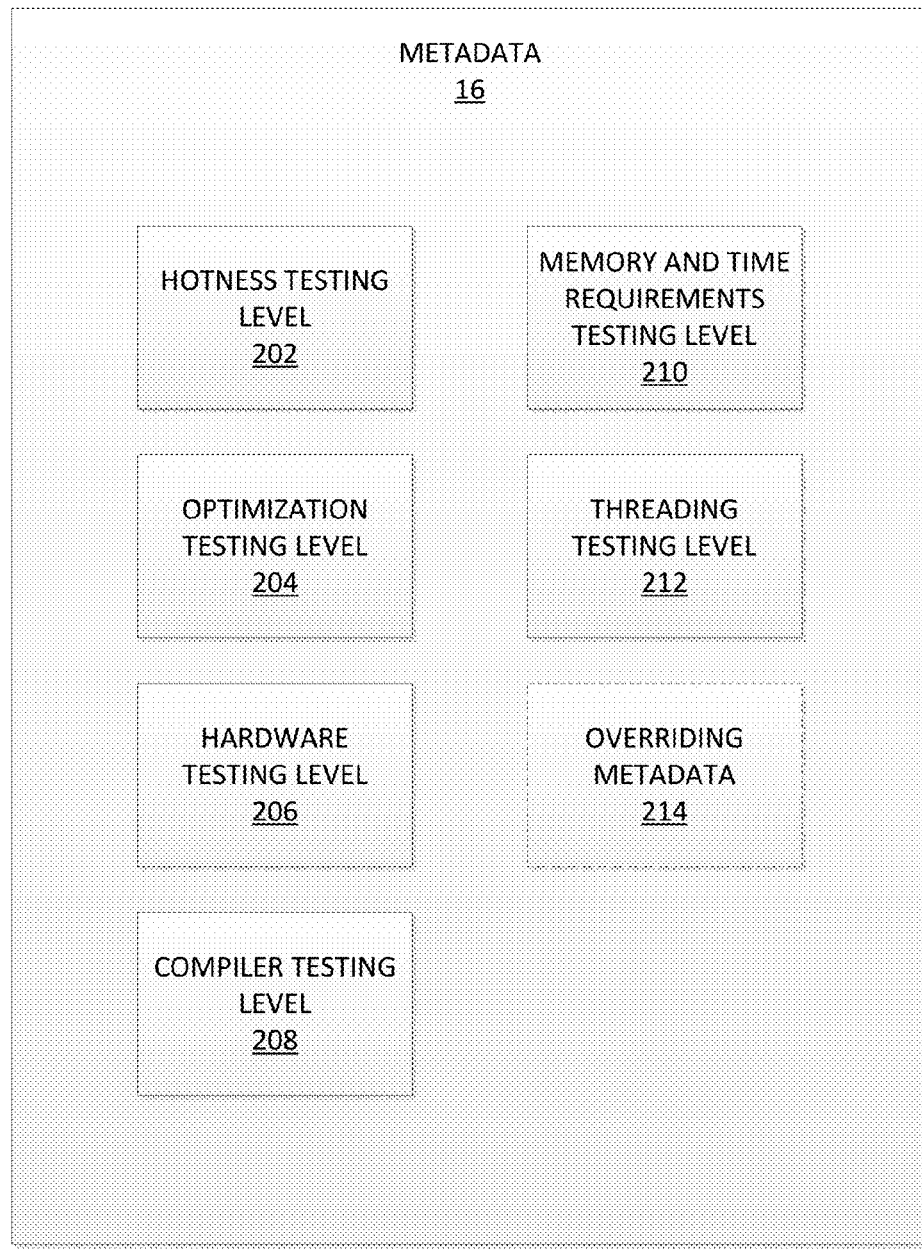
FIG. 2 shows a conceptual block diagram that illustrates in further detail portions of one embodiment of metadata, in one aspect of this disclosure.

FIG. 2 shows a conceptual block diagram that illustrates in further detail portions of one embodiment of metadata 16, in one aspect of this disclosure. In this example implementation, metadata 16 includes at least one of hotness testing level metadata 202 including information related to a hotness testing level; optimization testing level metadata 204 including information related to an optimization testing level; hardware testing level metadata 206 including information related to a hardware testing level; compiler testing level metadata 208 including information related to a compiler testing level; memory and time requirements testing level metadata 210 including information related to a memory and time requirements testing level; threading testing level metadata 212 including information related to a threading testing level; and potentially additional overriding metadata 214 applied at a finer granularity.

As an example of additional overriding metadata 214, in DevOps in-the-cloud environments, software release cycles and testing may generally be set for every week. In each weekly software release, new portions of code may be added or old portions of code may be modified. Additional overriding metadata 214 may index or reference new portions of code or newly modified portions of code, and include new or newly modified overriding metadata associated with the new portions of code or newly modified portions of code. Additional overriding metadata 214 may thus enable the dynamic compiler and optimizer 20 to perform compilation and optimization only on the new portions of code or the modified portions of code or as necessary due to the new changes in the code, and refrain from using time and processing resources to completely re-compile and re-optimize the entire code in the new software release.

As noted above, metadata 16 may be associated with one or more selected segments 10 of deployed code, including classes or compilations units, methods, collections of basic blocks (e.g., loops), and individual basic blocks of one or more code portions 14. Dynamic compilation system 22 may include in metadata 16 information about the selected segments 10 of deployed code based on dynamic measurements, for example. For example, dynamic compilation system 22 may include in metadata 16 hotness testing level metadata 202 with information on the hotness testing level of the selected segments 10. Information on the hotness testing level of the selected segments 10 may include information relating to previous tests or training runs performed in development environment 12. Information collected from such previous tests or training runs may include profiling information at a function or basic block level. The collection of profiling information has various potential benefits including enabling the dynamic compiler 20 to begin optimizing portions of code that are indicated by metadata 16 to be hot. Determining the hotness of a segment of deployed code at deploy time by dynamic compilation system 22 may greatly reduce the need to determine hotness at runtime and may greatly reduce repetitive recompilation of hot code portions.

Dynamic compilation system 22 may include in metadata 16 optimization testing level metadata 204 with information on the optimization testing level of the selected segments 10. Information on the optimization testing level of the selected segments 10 may include information relating to the optimization level the code portions 14 were previously tested in the development environment 12. For example, dynamic compilation system 22 may indicate in metadata 16 if the speed at which to compile and test the application source code was limited to only a basic level of optimization. The dynamic optimizer 20 can then limit itself to a basic level of optimization based on information in the optimization testing level metadata 204 contained within the metadata 16. Information relating to optimization testing level metadata 204 may further be used with updates to application source code, such that dynamic compilation system 22 may indicate in metadata 16 that the specific updates to application source code can be compiled at higher optimization levels, whereas the remaining code is compiled at lower optimization levels.

Such optimization levels may include a local basic block level, a subprogram level, a file level, and a whole-program level, for example.

Dynamic compilation system 22 may include in metadata 16 hardware testing level metadata 206 including information related to the hardware testing level of the selected segments 10. Information related to the hardware testing level of the selected segments 10 may include information relating to what the highest hardware level the code portions 14 have been previously been tested with in the development environment 12. In particular, information in hardware testing level metadata 206 may inform the compiler 20 associated with the target unit 18 what hardware level the compiler 20 has been allowed to optimize for. For example, if the application source code has been tested using a compiler that is set to a power of 7, then the dynamic optimizer 20 can use power 7 specific instructions and can use knowledge of power 7 scheduling and other idiosyncrasies in order to produce code with speed optimized for execution on that architecture. When deployed to a power 8 compiler, the compiler 20 associated with the target unit 18 will not use power 8 on application source code that hasn't been tested for power 8, as that could expose bugs either in the compiler 20 or the application that have not yet been subjected to testing.

Dynamic compilation system 22 may include in metadata 16 compiler testing level metadata 208 including information related to the compiler testing level of the selected segments 10. Information related to the compiler testing level of the selected segments 10 may include information relating to what version or level of compiler the code portions 14 have been previously compiled and tested with in development environment 12. If the version of compiler 20 installed on target unit 18 is different, the metadata 16 serves as a warning to target unit 18. If the version of compiler 20 installed on target unit 18 is newer, target unit 18 may refrain from using newer features where those features may expose bugs either in the compiler or the application. For example, compiler 20 having information from compiler testing level metadata 208 of an earlier version of a compiler used during testing may enable compiler 20 to scale back aggressive aliasing analysis in order to prevent runtime bugs from being exposed. On the other hand, compiler 20 having metadata information from compiler testing level metadata 208 of a newer compiler's more aggressive alias analysis technique may enable compiler 20 to expose software bugs.

Dynamic compilation system 22 may include in metadata 16 memory and time requirements testing level metadata 210 including information related to the memory and time requirements testing level of the selected segments 10. Information related to the memory and time requirements testing level of the selected segments 10 may include information generated in development environment 12 related to portions of code such as routine, loop, or compilation sections that require large memory or time requirements to compile at higher optimization levels. For example, some program portions can cause the compiler to use large amounts of memory and/or time if compiled at higher optimization levels. Without having information relating to memory and time requirements before runtime, a compiler may discover at runtime that there is insufficient memory to compile the deployed code, or may hang or crash the compiler due to running out of memory.

Dynamic compilation system 22 may include in metadata 16 threading testing level metadata 212 including information related to the threading testing level of the selected segments 10. Information related to the threading testing level of the selected segments 10 may include information, generated in development environment 12, related to the threading level configuration of the machine an application is running on. Threading levels may affect scheduling and other aspects of compilation such as the use of machine registers. Testing the application may provide information on the ideal threading level, which may be more optimal to expose a software bug that other threading levels may not find. For example, an application provider may test the application at a threading level "n" and dynamic compilation system 22 may determine that threading level "n" may be enabled to expose bugs that a threading level "m" may not expose, even though target unit 18 may be configured for a threading level of "m". Dynamic compilation system 22 may determine that threading level "n" may be an ideal threading level for compiler 20 to implement or include. Dynamic compilation system 22 may provide threading testing level metadata 212 including information related to threading testing levels to compiler 20, such as that the threading level "n" may expose bugs that threading level "m" does not expose.

Figure 3:
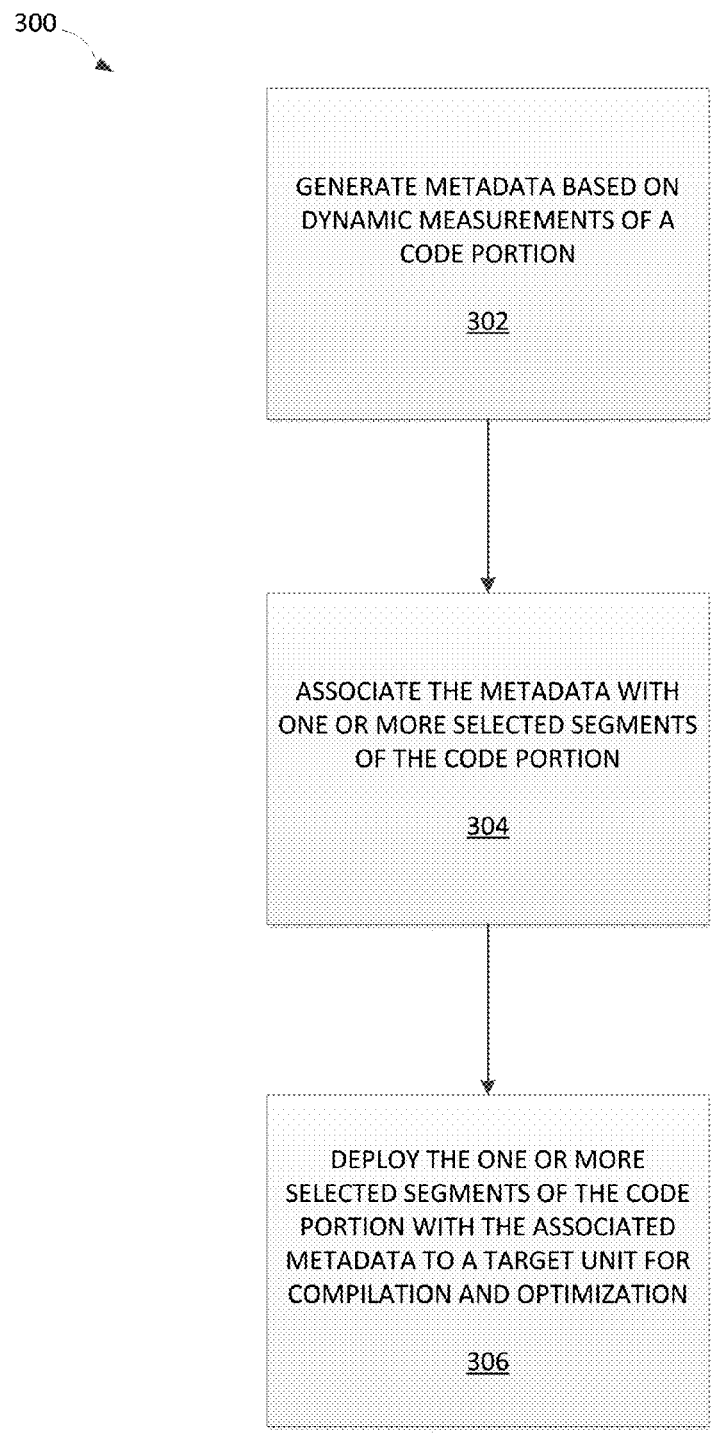
FIG. 3 depicts a flowchart of an example of a program metadata development process, executed on one or more computing devices (e.g., servers, computers, processors, etc.), in one aspect of this disclosure.

FIG. 3 depicts a flowchart of an example program metadata development process 300, executed on one or more computing devices (e.g., servers, computers, processors, etc.), in one aspect of this disclosure. Process 300 may include generating, with one or more processing devices, metadata associated with one or more code portions (302). Process 300 may further include associating, with one or more processing devices, the developed metadata with one or more selected segments of deployed code representing the code portion (304). Process 300 may further include deploying, with one or more processing devices, the selected segment with the associated metadata to a target unit for compilation and optimization (306).

Various implementations of process 300 may also include any of the processes described above with reference to FIGS. 1 and 2. For example, dynamic compilation system 22 generating metadata associated with one or more code portions may occur in a development environment. In another example, the selected segments of deployed code may include at least one predetermined unit of classes or compilation units, methods, collections of basic blocks further including loops, and individual basic blocks.

In one example, metadata 16 may be generated by one or more processing devices of dynamic compilation system 22 to create or modify fields or elements of metadata related to one or more code portions developed in each software release. For exemplary purposes, metadata 16 may be expressed in a number of different markup or programming languages, such as plain text, HTML, XML, CSV, and RDF. The metadata 16 relating to the code portions 14 may include information relating to hotness testing level metadata 202, optimization testing level metadata 204, hardware testing level metadata 206, compiler testing level metadata 208, memory and time requirements testing level metadata 210, and threading testing level metadata 212 about the selected segments of code, which may include classes or compilation units, methods, collections of basic blocks, or individual basic blocks.

Figure 4:
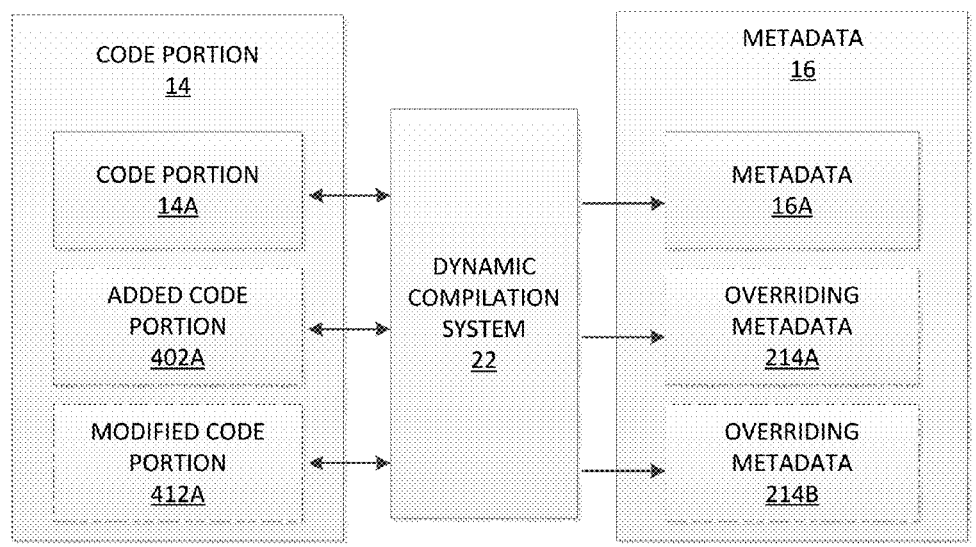
FIG. 4 depicts a block diagram of an example development of additional overriding metadata applied at a finer granularity for development of a subsequent dynamic compilation, executed on one or more computing devices (e.g., servers, computers, processors, etc.), in one aspect of this disclosure.

FIG. 4 depicts a block diagram of an example development of additional overriding metadata 214 applied at a finer granularity for development of a subsequent dynamic compilation, executed on one or more computing devices (e.g., servers, computers, processors, etc.), in one aspect of this disclosure. In FIG. 4, the development of metadata 16 may further include developing additional overriding metadata 214 applied at a finer granularity (e.g., nested levels of code structures such as classes and subclasses, blocks of programming declarations and statements, etc.) for developing information related to a subsequent dynamic compilation. For example, in DevOps in-the-cloud environments, software releases may be set for every week. In each weekly software release, the pre-existing code portions 14 may be updated with newly added code portions 402A or modified code portions 412A. Additional overriding metadata 214A and 214B (collectively "overriding metadata 214") provides information on which portions of code the dynamic compiler and optimizer 20 should focus on in an initial dynamic compilation or a subsequent dynamic compilation.

Dynamic compilation system 22 may thus generate additional overriding metadata 214 to associate with one or more selected smaller units of code, among the one or more selected segments of the code portion that are selected to deploy to the target unit 18, at a finer granularity than is applied for associating the remaining portion of the metadata 16 with the remaining portion of the selected segments of the code portion.

After dynamic compilation system 22 has generated metadata 16, potentially including overriding metadata 214, with one or more selected segments 10 of deployed code representing one or more code portions that may have been developed or modified in the latest software release, dynamic compilation system 22 may deploy the metadata 16 and the selected segments 10 to target unit 18 for compilation and optimization. In another example, the dynamic compilation system 22 may also deploy metadata 16 irrespective of whether any new or modified code portions were developed in a subsequent software release. For example, if additional testing is performed on code portions that were not modified from a previous version of the code portions, additional testing may generate updated information relating to hotness testing level metadata 202, optimization testing level metadata 204, hardware testing level metadata 206, compiler testing level metadata 208, and/or memory and time requirements testing level metadata 210 associated with the code portions. The dynamic compilation system 22 may deploy the updated metadata 16 to the target unit 18 for compilation and optimization.

Figure 5:
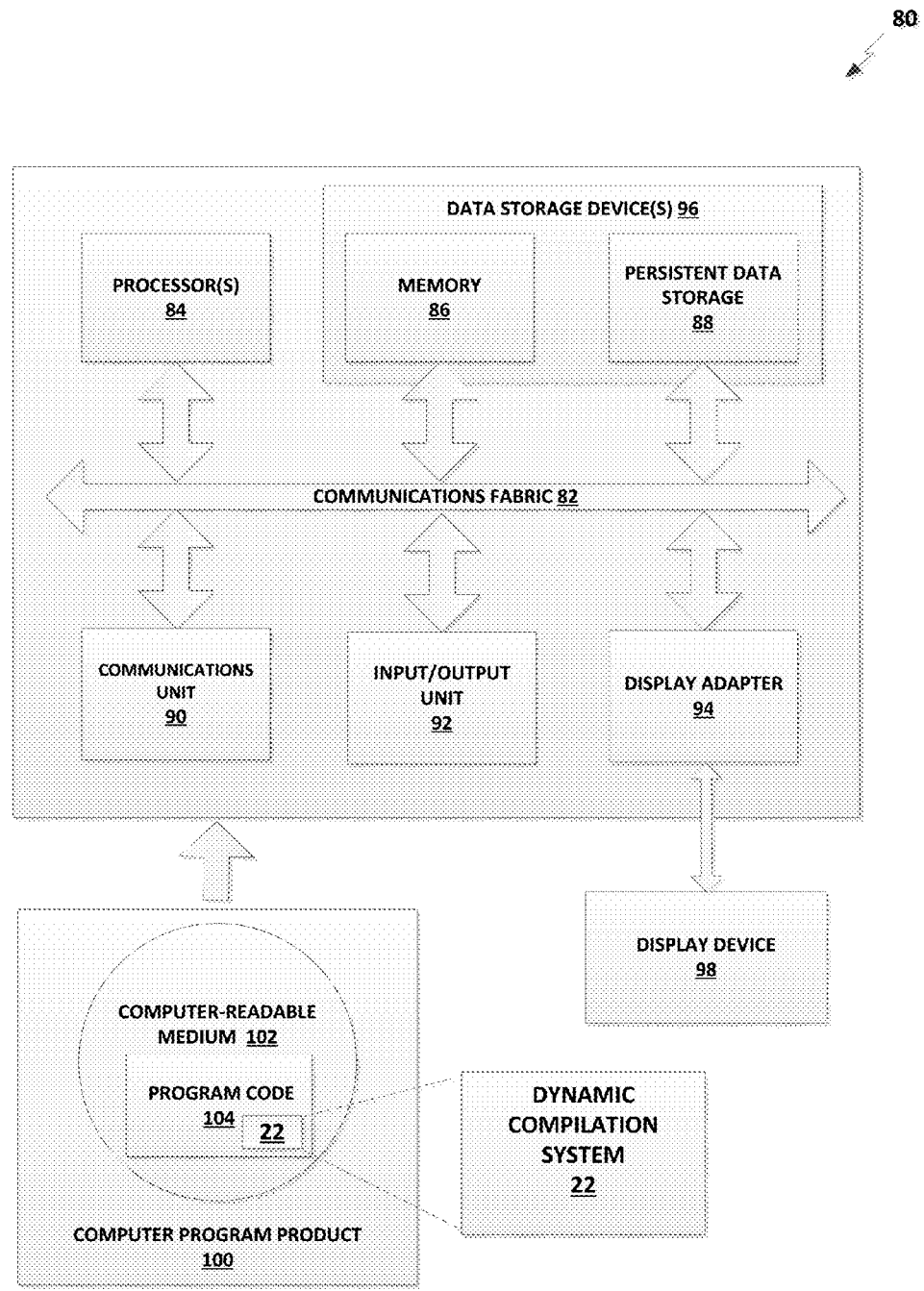
FIG. 5 shows a block diagram of a computing device that may be used to implement a dynamic compilation system, in one aspect of this disclosure.

FIG. 5 is a block diagram of a computing device 80 that may be used to implement a dynamic compilation system 22, in one aspect of this disclosure. Computing device 80 may be a server such as one of web servers or application servers. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 5, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology.

Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files including program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a dynamic compilation system 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which includes a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 including computer-executable instructions may be communicated or transferred to computing device 80 from computer-readable medium 102 through a hard-line or wireless communications link to communications unit 90 and/or through a connection to input/output unit 92. Computer-readable medium 102 including program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   generating, with one or more processing devices of a development environment, metadata based on one or more dynamic measurements of a code portion, wherein the one or more dynamic measurements include one or more testing levels of the code portion;
   associating, with the one or more processing devices, the metadata with one or more selected segments of the code portion; and
   deploying, with the one or more processing devices, the one or more selected segments of the code portion with the associated metadata from the development environment to a target unit to compile and optimize the selected segments of the code portion based on the one or more testing levels of the code portion.

2. The method of claim 1, wherein the one or more testing levels of the code portion comprise testing levels of one or more of a hotness testing level of the code portion, an optimization level testing level of the code portion, a hardware level testing level of the code portion, a compiler level testing level of the code portion, a memory and time requirements testing level of the code portion, and a threading level testing level of the code portion.

3. The method of claim 2, wherein generating the information of the hotness testing level includes generating profiling information of the code portion, and wherein the profiling information is enabled for use for at least one of the compilation and the optimization.

4. The method of claim 2, wherein generating the information of the optimization testing level includes generating information on at least one of a local basic block level, a subprogram level, a file level, and a whole-program level of the code portion, and wherein the optimization testing level information is enabled for use for at least one of the compilation and the optimization.

5. The method of claim 2, wherein generating the information of the hardware testing level includes generating information on a highest hardware level of the code portion, and wherein the hardware testing level information is enabled for use for at least one of the compilation and the optimization.

6. The method of claim 2, wherein generating the information of the compiler testing level includes generating information on a compiler version of the code portion, and wherein the compiler testing level information is enabled for use for at least one of the compilation and the optimization.

7. The method of claim 2, wherein generating the information of the memory and time testing level includes generating information on at least one of a memory requirement and a time requirement of a routine, loop, or compilation of the code portion, and wherein the memory and time testing level information is enabled for use for at least one of the compilation and the optimization.

8. The method of claim 2, wherein generating the information of the threading testing level includes generating information based on a predetermined threading level of the code portion, and wherein the threading testing level information is enabled for use for at least one of the compilation and the optimization.

9. The method of claim 1, wherein generating the metadata comprises generating metadata based on one or more dynamic measurements of a portion of at least one of bytecode, pre-compiled classes, and statically compiled binaries.

10. The method of claim 1, wherein generating the metadata includes generating additional overriding metadata to associate with one or more selected smaller units of code among the one or more selected segments of the code portion at a finer granularity than is applied for associating a remaining portion of the metadata with a remaining portion of the one or more selected segments of the code portion, wherein the one or more selected smaller units of code comprise newly added code or newly modified code.

11. A computer system comprising:
one or more processors, one or more computer-readable memories, and one or more non-transitory computer-readable storage mediums;
program instructions, stored on at least one of the one or more storage mediums for execution by at least one of the one or more processors via at least one of the one or more memories, to generate metadata based on one or more dynamic measurements of a code portion, wherein the one or more dynamic measurements include one or more testing levels of the code portion;
program instructions, stored on at least one of the one or more storage mediums for execution by at least one of the one or more processors via at least one of the one or more memories, to associate the metadata with one or more selected segments of the code portion; and
program instructions, stored on at least one of the one or more storage mediums for execution by at least one of the one or more processors via at least one of the one or more memories, to deploy the selected segment of the code portion with the associated metadata from a development environment to a target unit to compile and optimize the selected segments of the code portion based on the one or more testing levels of the code portion.

12. The computer system of claim 11, wherein the program instructions to generate the metadata comprise program instructions to generate the one or more testing levels of the code portion comprising testing levels of one or more of a hotness testing level of the code portion, an optimization testing level of the code portion, a hardware testing level of the code portion, a compiler testing level of the code portion, a memory and time requirements testing level of the code portion, and a threading testing level of the code portion.

13. The computer system of claim 12, wherein the program instructions to generate the information of the hotness testing level comprise program instructions to generate profiling information of the code portion, and wherein the profiling information is enabled for use for at least one of the compilation and the optimization.

14. The computer system of claim 12, wherein the program instructions to generate the information of the optimization testing level comprise program instructions to generate information on at least one of a local basic block level, a subprogram level, a file level, and a whole-program level of the code portion, and wherein the optimization testing level information is enabled for use for at least one of the compilation and the optimization.

15. The computer system of claim 12, wherein the program instructions to generate the information of the hardware testing level comprise program instructions to generate information on a highest hardware level of the code portion, and wherein the hardware testing level information is enabled for use for at least one of the compilation and the optimization.

16. The computer system of claim 12, wherein the program instructions to generate the information of the compiler testing level comprise program instructions for generating information on a compiler version of the code portion, and wherein the compiler testing level information is enabled for use for at least one of the compilation and the optimization.

17. The computer system of claim 12, wherein the program instructions to generate the information of the memory and time testing level comprise program instructions to generate information on at least one of a memory requirement and a time requirement of a routine, loop, or compilation of the code portion, and wherein the memory and time testing level information is enabled for use for at least one of the compilation and the optimization.

18. The computer system of claim 12, wherein the program instructions to generate the information of the threading testing level comprise program instructions to generate information based on a predetermined threading level of the code portion, and wherein the threading testing level information is enabled for use for at least one of the compilation and the optimization.

19. A method comprising:
receiving, with one or more processing devices of a target unit, one or more deployed segments of code and associated metadata from a development environment, wherein the metadata is based on one or more dynamic measurements of a code portion comprising the one or more deployed segments of code, and wherein the one or more dynamic measurements include one or more testing levels of the code portion; and
compiling and optimizing, with the one or more processing devices, the one or more deployed segments of code in accordance with the metadata.

20. The method of claim 19, wherein the one or more testing levels of the code portion comprise testing levels of one or more of a hotness testing level of the code portion, an optimization testing level of the code portion, a hardware testing level of the code portion, a compiler testing level of the code portion, a memory and time requirements testing level of the code portion, and a threading testing level of the code portion.

* * * * *